United States Patent
Pizlo et al.

(10) Patent No.: US 9,225,964 B2
(45) Date of Patent: Dec. 29, 2015

(54) FIGURE-GROUND ORGANIZATION OF 3-D SCENES

(75) Inventors: Zygmunt Pizlo, Indianapolis, IN (US); Tadamasa Sawada, West Lafayette, IN (US); Yunfeng Li, Whitewater, WI (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 333 days.

(21) Appl. No.: 14/001,227

(22) PCT Filed: Feb. 24, 2012

(86) PCT No.: PCT/US2012/026660
§ 371 (c)(1),
(2), (4) Date: Oct. 29, 2013

(87) PCT Pub. No.: WO2012/116350
PCT Pub. Date: Aug. 30, 2012

(65) Prior Publication Data
US 2014/0049613 A1    Feb. 20, 2014

Related U.S. Application Data

(60) Provisional application No. 61/446,489, filed on Feb. 24, 2011.

(51) Int. Cl.
*H04N 13/02*    (2006.01)
*H04N 13/00*    (2006.01)
(Continued)

(52) U.S. Cl.
CPC .......... *H04N 13/0203* (2013.01); *G06T 7/0042* (2013.01); *G06T 7/0075* (2013.01); *G06T 2207/10012* (2013.01)

(58) Field of Classification Search
CPC  H04N 13/0203; G06T 7/0042; G06T 7/0075; G06T 2207/10012
USPC .......................................................... 348/46
See application file for complete search history.

(56) References Cited

U.S. PATENT DOCUMENTS 5,175,616 A  *  12/1992  Milgram ................ G03B 35/08
                                                        348/47
6,639,596 B1 *  10/2003  Shum ..................... G06K 9/209
                                                        345/427

(Continued)

OTHER PUBLICATIONS

Bertozzi et al., "GOLD: A Parallel Real-Time Stereo Vision System for Generic Obstacle and Lane Detection," IEE Transactions on Image Processing, vol. 7, No. 1, Jan. 1998, 20 pages.

(Continued)

*Primary Examiner* — Hee-Yong Kim
(74) *Attorney, Agent, or Firm* — Purdue Research Foundation

(57) ABSTRACT

Systems and methods for processing a pair of 2-D images are described. In one example, a stereoscopic set of images is converted into a collection of regions that represent individual 3-D objects in the pair of images. In one embodiment, the system recovers the 3-D point P for each point p that appears in both images. It estimates the 3-D orientation of the floor plane, and the image capture planes and their height from the floor. The system then identifies the collection B of points P that do not represent points on the floor and generates a projection C of B onto a plane parallel to the floor. It blurs the projection C and identifies peaks in the blurred image, then fits symmetric figures to the points in C around the identified peaks. The system projects the 3-D figures associated with the symmetric figures back onto the 2-D images.

8 Claims, 6 Drawing Sheets

(51) Int. Cl.
*G06T 15/00* (2011.01)
*F23N 5/26* (2006.01)
*G06T 7/00* (2006.01)

(56) References Cited

U.S. PATENT DOCUMENTS

| | | |
|---|---|---|
| 2003/0220555 A1 | 11/2003 | Heigl et al. |
| 2005/0152590 A1 | 7/2005 | Thieret et al. |
| 2007/0080960 A1 | 4/2007 | Dayanand et al. |
| 2008/0233523 A1* | 9/2008 | Diepenbroek ............ F23G 5/50 431/14 |
| 2010/0014781 A1 | 1/2010 | Liu et al. |

OTHER PUBLICATIONS

Burschka et al., "Stereo-Based Obstacle Avoidance in Indoor Environments with Active Sensor Re-Calibration," Proceedings of 2002 IEEE International Conference, May 2002, 7 pages.

Lee et al., "A Stereo Matching Algorithm based on Top-view Transformation and Dynamic Programing for Road-vehicle Detection," International Journal of Control, Automation, and Systems (2009), 12 pages.

KIPO, Serial No. PCT/US2012/026660, Search Report & Written Opinion, mailed Dec. 27, 2012, 6 pages.

* cited by examiner

FIGURE-GROUND ORGANIZATION OF 3-D SCENES

CROSS REFERENCE TO RELATED APPLICATION

This application is a national stage filing of PCT/US2012/026660, filed Feb. 24, 2012, which claims the benefit of priority to U.S. Provisional Patent Application Ser. No. 61/446,489, filed Feb. 24, 2011, both of which are incorporated herein by reference.

GOVERNMENT RIGHTS

This invention was made with government support under Grant Number FA9550-09-D-0207 awarded by the United States Air Force Office of Scientific Research. The government has certain rights in the invention.

FIELD

This disclosure relates to processing of images. More particularly, the disclosure relates to the estimation of object locations from a stereoscopic pair of images.

SUMMARY

Systems and methods for processing a pair of 2-D images are described. In one example, a stereoscopic set of images is converted into a collection of regions that represent individual 3-D objects in the pair of images. In some embodiments, the system recovers the 3-D point P for each point p that appears in both images. It estimates the 3-D orientation of the plane of the floor, the image capture planes, and the height of the image capture planes from the floor. The system then identifies the collection B of points P that do not represent points on the floor and generates a projection C of B onto a plane parallel to the floor. It blurs the projection C and identifies peaks in the blurred image, then fits symmetric figures to the points in C around the identified peaks. Objects located using these symmetric figures are sometimes mapped back to the original 2-D images, while at other times the 3-D position of objects represented by the symmetric figures are used to reveal camouflaged objects, operate robots in dangerous environments, assist the elderly or disabled by supplementing navigational ability, assisting vision-impaired persons walking or driving, informing automatic driving or supplemental driver information systems, guiding robots in navigating home situations, supplementing monitoring of endoscopic and laparoscopic surgery, and the like.

DESCRIPTION

Figure 1:
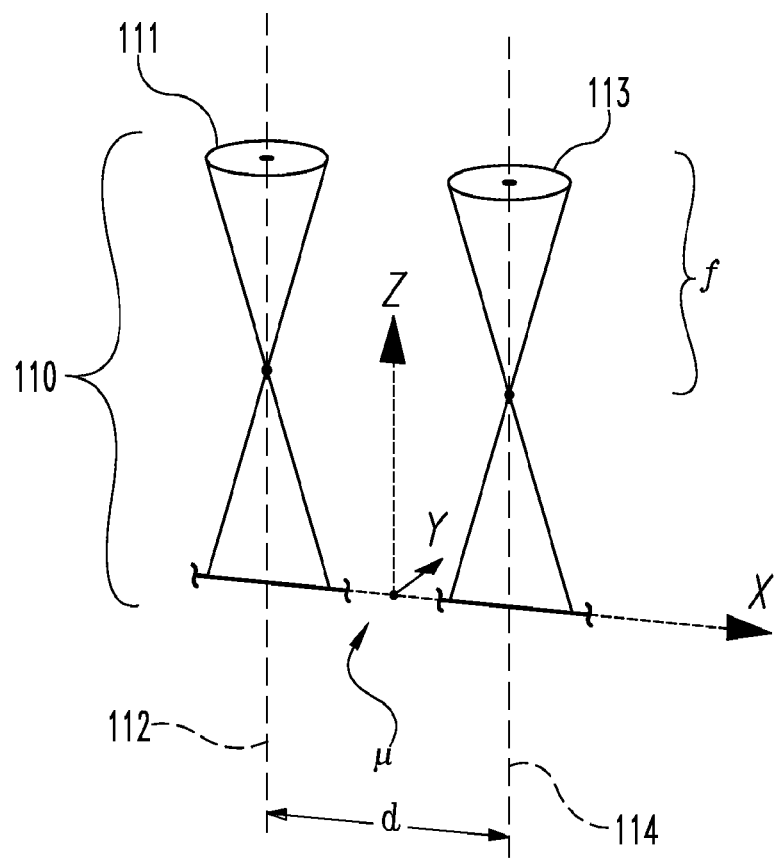
FIG. 1 is a plan view of a scene being captured by a stereo camera.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, one form of the present system is a method of detecting objects in 3-D scenes from two 2-D images acquired by a stereo camera. Consider as an example, with reference to FIG. 1, a scene 100 comprising several pieces of furniture (see FIGS. 2(a)-2(b)). The camera 110 is preferably calibrated using a standard method so that certain intrinsic parameters, such as the focal length (f) in terms of pixels, the principal point ($\mu_X, \mu_Y$), and the distance (d) between the two lenses 111 and 113, are known. As illustrated in FIG. 3, the process 300 implemented by this embodiment includes four stages: (1) computation 310 of a depth map of visible texture points using a stereo correspondence algorithm; (2) estimation 320 of the extrinsic parameters for the camera: position and orientation relative to the floor; (3) computation 330 of the top view of the recovered 3-D points and identification of 3-D objects; and (4) projection 340 of the estimated 3-D objects on the 2-D images and identification of the 2-D regions representing the objects. In some embodiments, it is valuable that the process produces a spatially global map of a 3-D scene from a single viewpoint without physical exploration of the scene. In others, it is valuable that the process recovers objects and contours in obscured or occluded space behind other objects, making it possible to plan navigation through that space. In still other embodiments, it is important that this process can reconstruct amorphous objects such as flames and smoke.

1. Computation of Depth Map

Figure 2A:
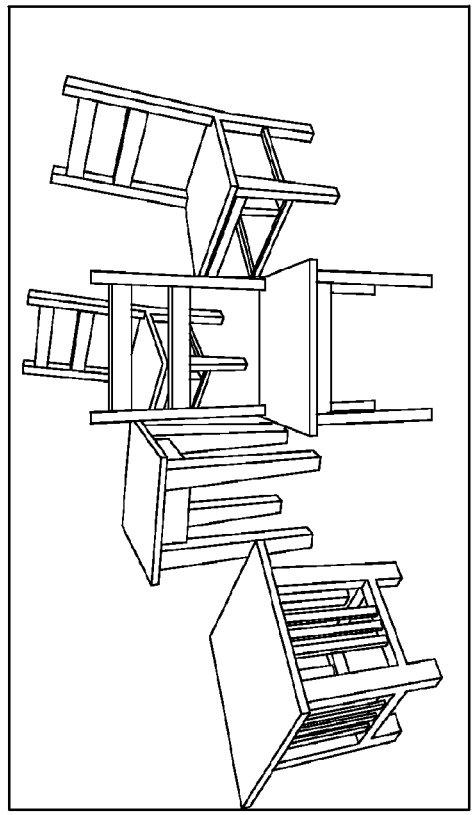
FIGS. 2(a) and 2(b) are a pair of images taken by the stereo camera in FIG. 1.
Figure 2B:
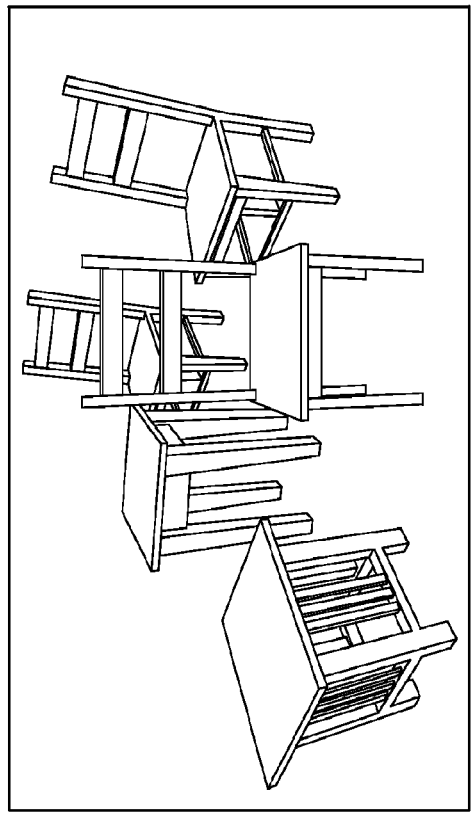
Figure 3:
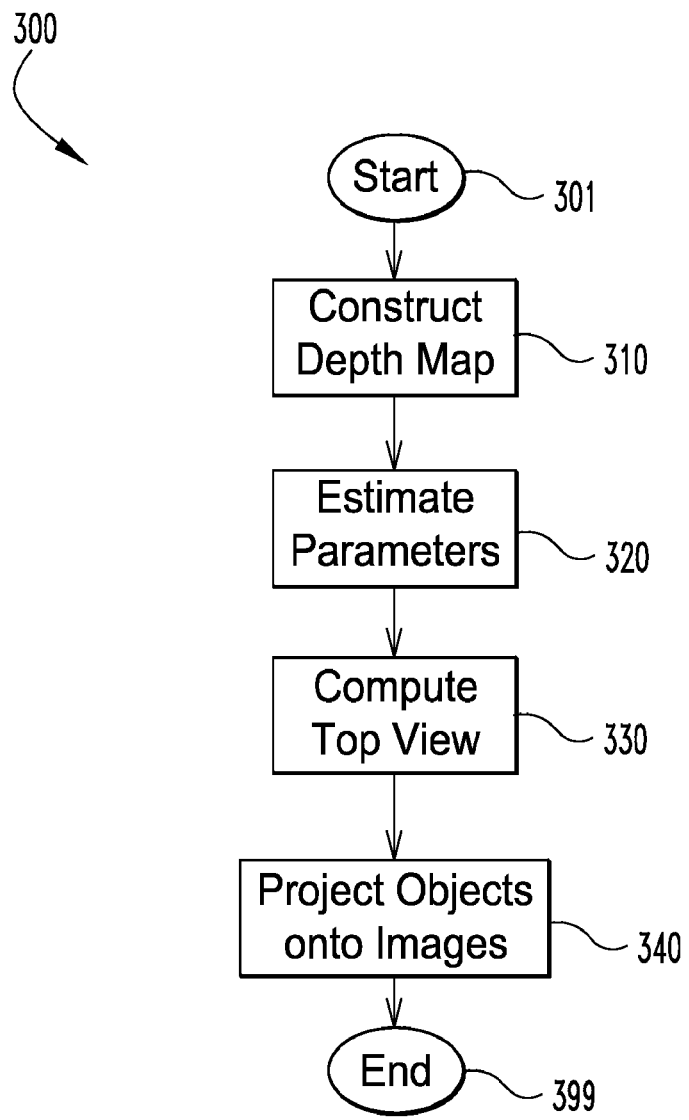
FIG. 3 is a flowchart illustrating a scene recovery process according to an illustrated embodiment.

A pair of stereoscopic images (see FIGS. 2(a)-2(b)) was acquired from a standard stereo camera 110. The camera in this embodiment is equipped with two identical lenses 111 and 113, and the principal axes 112 and 114 are parallel. This implies that given a point in the right image, its corresponding point is on the same row in the left image (sometimes known as the "epipolar constraint") and is shifted a little to the right. Assume that a point p in the right image has coordinates expressed in homogenous coordinates:

$$p = (x, y, 1)^T \qquad (1)$$

(Note that capital letters herein represent 3-D points, and lowercase letters represent 2-D points.) Its corresponding point in the left image (assuming that it exists) is $$p = (x + \Delta x, y, 1) \qquad (2)$$

Then in this embodiment the disparity δ for the point p is defined as follows $$\delta(p) = \begin{cases} \Delta x & \text{if exists} \\ 255 & \text{otherwise} \end{cases} \qquad (3)$$

Though other disparity functions will occur to those skilled in the art, this embodiment uses the Sum of Absolute Difference Correlation method (Wong, Vassiliadis & Cotofana, 2002) to compute the disparity for each point. We use o to represent those points in the right images that have corresponding points in the left image.

Using triangulation, for each point p in o, we recover the 3-D point P as follows:

$$P = Lp \text{ and } p \in o \tag{4}$$

where $$L(p) = \begin{pmatrix} \frac{d}{\delta(p)} & 0 & \frac{d}{2} - \frac{d\mu_X}{\delta(p)} \\ 0 & \frac{d}{\delta(p)} & -\frac{d\mu_Y}{\delta(p)} \\ 0 & 0 & \frac{df}{\delta(p)} \\ 0 & 0 & 1 \end{pmatrix} \tag{5}$$

Note L is a point-specific matrix function in terms of p. That is, for different points p, L will be different. The coordinates of the recovered point P are expressed in the camera coordinate system. As shown in FIG. 1, the origin of this coordinate system is the midpoint μ between the projection centers of the two lenses. The X axis is parallel to the line connecting the two projection centers. The XY plane is parallel to the image plane, and the Z axis represents the depth direction.

2. Extrinsic Camera Parameters

At this stage, shown as step 320 in FIG. 3, this illustrated embodiment estimates certain extrinsic camera parameters; namely, the 3-D orientation and their distance from the floor (the term being used generically herein to refer to an actual floor, the ground, a road, or any other approximately piece-wise-planar surface). Typically, most of the image points represent the floor. As a result, most of the 3-D points in the depth map are floor points. In the illustrated embodiment, a 3-D plane is fit to all points in the depth map. This is done by performing a search in the 3-parameter space (3-D orientation and distance from the camera). For each 3-D plane, we count the number of 3-D points that are close to the plane. The plane which fits the maximum number of points is chosen as the floor. Once the floor is detected, the camera extrinsic parameters are determined. The details of estimating the extrinsic camera parameters are described below.

We used roll and pitch to define the orientation of the camera relative to the floor. Rotation around the principal axis of the camera is called roll, and rotation around the X axis is called pitch. When the camera faces down, the pitch angle is negative, and when the camera faces up, the pitch angle is positive. In the exemplary setup illustrated here, the stereo camera is mounted on a robot, and its roll angle is close to zero. This substantially reduces the search space for extrinsic camera calibration.

Assume that the roll and pitch angles of the camera relative to the floor are α and β (expressed, for example, in degrees), respectively, and the camera height is h (measured, for example, in millimeters). Then the floor is a function of α, β, and h. In the camera-related coordinate system, the floor plane is expressed in homogenous coordinates as follows:

$$\pi(\alpha,\beta,h)=(\sin(\alpha)\cos(\beta),\cos(\alpha)\cos(\beta),-\sin(\beta),-h)^T \tag{6}$$

The vector formed by the first three elements represents the normal of the floor plane, and it has been normalized. The signed distance d between the floor plane π and the recovered point P from the set of recovered 3-D points A is:

$$d(P)=\pi^T P \text{ and } P \in A. \tag{7}$$

Positive distance means that the point P is under the floor, while negative means that P is above the floor.

We define a step function that characterizes whether a signed distance d is "close enough" to the floor, $$g(d) = \begin{cases} 1 & |d| \leq c_1 \\ 0 & \text{otherwise} \end{cases} \tag{8}$$

where $c_1$ is the threshold that defines the "thickness" of the floor. The summation of g(d) over A represents the number of 3-D points that fall on (i.e., within a vertical distance $c_1$ of) the floor. In the illustrated embodiment, setting $c_1$ equal to 5 mm leads to good results. The plane that maximizes $$\sum_{d \in A} g(d)$$

(i.e., the plane with maximum 3-D points "on" it) is considered the floor.

In many embodiments, the height of the camera is known, so the search for the distance of the floor from the camera is fairly limited. To speed up the search even more, some embodiments include an inclinometer on the camera for measuring the direction of gravity. This gives a good first estimate of the orientation of a horizontal floor.

Assume that the three estimated parameters for the floor are $\alpha_F$, $\beta_F$ and $h_F$. Then we can obtain the floor-related camera matrix $$H_{cam} = KR(I_{3 \times 3} | -C_{3 \times 1}) \tag{9}$$

where $$R = \begin{pmatrix} \cos(\alpha_F) & \sin(\alpha_F)\cos(\beta_F) & \sin(\alpha_F)\sin(\beta_F) \\ -\sin(\alpha_F) & \cos(\alpha_F)\cos(\beta_F) & \cos(\alpha_F)\sin(\beta_F) \\ 0 & -\sin(\beta_F) & \cos(\beta_F) \end{pmatrix} \tag{10}$$

and C is defined as $$C_L = \left(-\frac{d}{2}, 0, 0\right)^T \tag{11}$$

for the left camera and $$C_R = \left(\frac{d}{2}, 0, 0\right)^T \tag{12}$$

for the right camera.

3. Identification of Objects in the Scene

In this stage (block 330 in process 300, illustrated in FIG. 3), the present embodiment generates the top view of the recovered 3-D points and identifies objects by fitting rectangles to the projected points. The frequent success of this approach is related to certain a priori constraints that are almost always satisfied in a natural 3-D scene. First, most objects are roughly mirror-symmetric in overall form. This occurs, for example, with animal and human bodies, as well as many man-made objects. Furthermore, the plane of symmetry is almost always orthogonal to the horizontal ground. This means that the symmetry of these objects will be preserved in the top view. Second, most important objects have appreciable height above the floor, and because of gravity, they have a number of vertical parts/edges/legs that serve the purpose of maintaining balance. It follows that the projection of texture points on these parts will produce a very reliable indication of the location of the objects. As a result, the presence and location of objects can be identified despite noise and occlusions. In the present embodiment, this stage 330 consists of several steps.

(1) Removal of the Floor Points

Using the floor equation obtained in stage 320, we remove from A those points that are close to the floor and all those that are under the floor (in some embodiments, the points under the floor are assumed to represent errors) and we only keep those that are above floor, B. In this step, typically about 80% of the points in the depth map are removed.

(2) Generation of the Top View.

Note that up to this point in this embodiment, the coordinates of the recovered 3-D points have been expressed in the camera coordinate system. Once the orientation of the floor is known, the depth map is expressed in the room coordinate system. In this new coordinate system, the origin is still the midpoint between the two projection centers of the cameras. The Y axis is the normal of the floor, and the X axis represents the projected direction of the old X axis (the line connecting two projection centers) on the floor. The Z axis is the cross-product of X and Y. Note that the Z value of a recovered 3-D point represents its distance to the plane that is perpendicular to the floor and passes through the two projection centers of the cameras. The top view image of the recovered 3-D points is their orthographic projection on the XZ plane. Given a 3-D point P, its corresponding point in the top view image is $$q = QMP \text{ and } P \in B \quad (13)$$

where $$Q = \begin{pmatrix} 1 & 0 & 0 & 0 \\ 0 & 0 & 1 & 0 \\ 0 & 0 & 0 & 1 \end{pmatrix} \quad (14)$$

and $$M = \begin{pmatrix} R^T & \vec{0}_{3 \times 1} \\ \vec{0}_{3 \times 1}^T & 1 \end{pmatrix}. \quad (15)$$

Combining Equation (4) with Equation (13), we obtain $$q = QMLp \; p \in b. \quad (16)$$

where b is the set of points in the original image that map to B. Equation (16) shows how we can transfer from the original depth map to top view image. In this embodiment, the top-view image is quantized so that each pixel represents a fixed-size square in the plane of the floor, (e.g., 1 mm×1 mm), in which if one or more 3-D points fall, the value for this pixel is 1. Otherwise it is 0.

(3) Detection of the Position of the Objects.

Assume that the maximum diagonal size of the objects of interest in the top view is r. First, blur the top view image using the following filter $$G(x, y) = \begin{cases} 1 & x^2 + y^2 \leq \dfrac{r^2}{4} \\ 0 & \text{otherwise} \end{cases}. \quad (17)$$

Figure 4A:
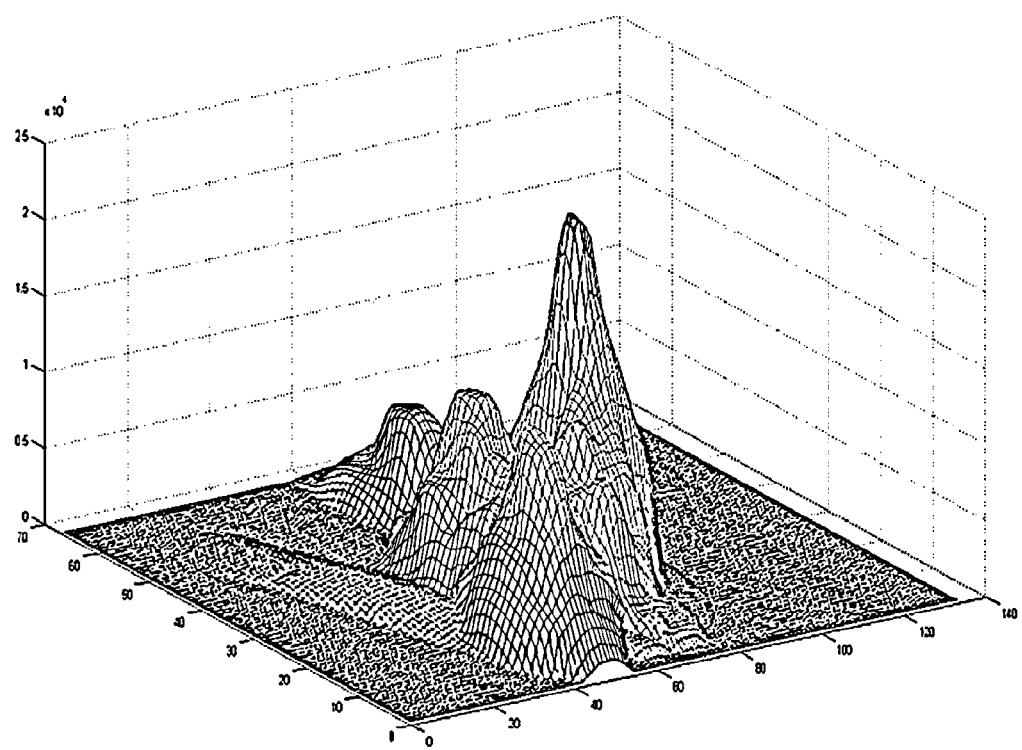
FIG. 4(a) is the blurring result of the top view image in an illustrated embodiment, where each peak/cluster corresponds to a potential object.
Figure 4B:
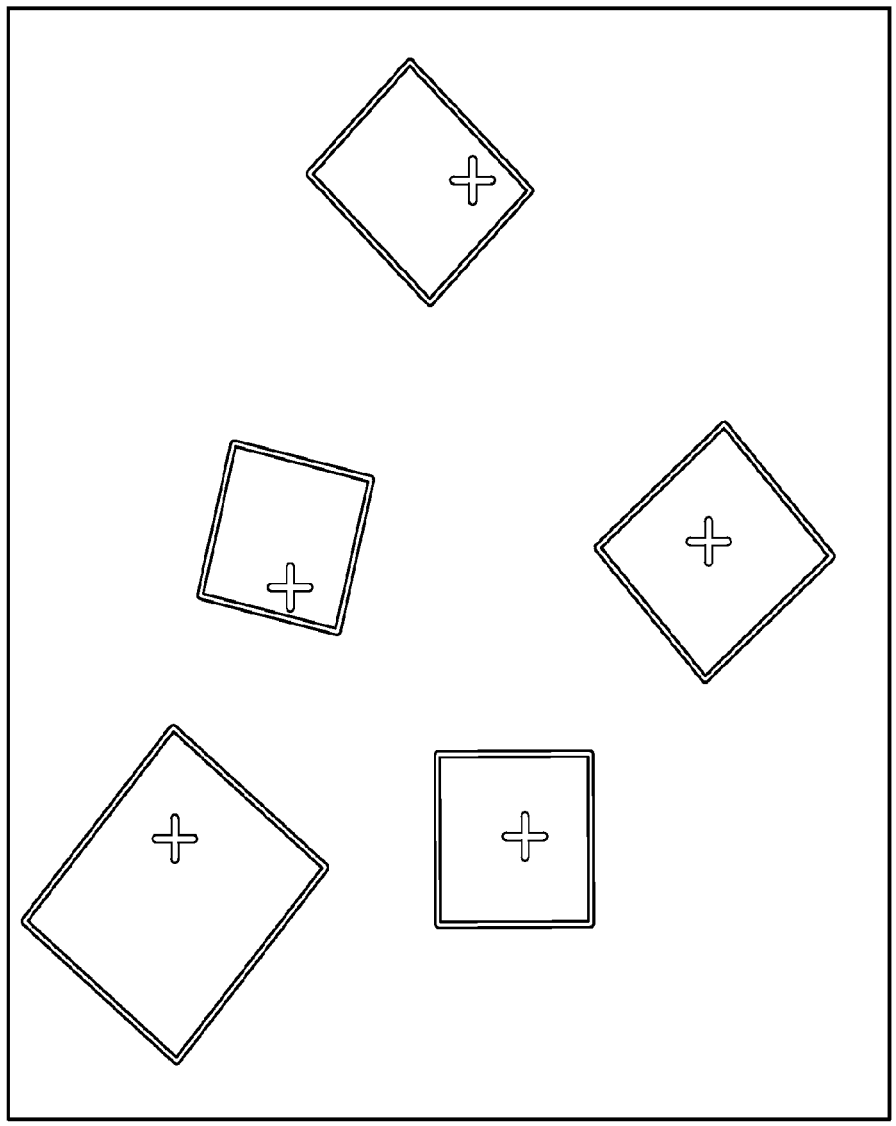
FIG. 4(b) illustrates the detected objects in the top-view image blurred in FIG. 4(a).
Figure 5:
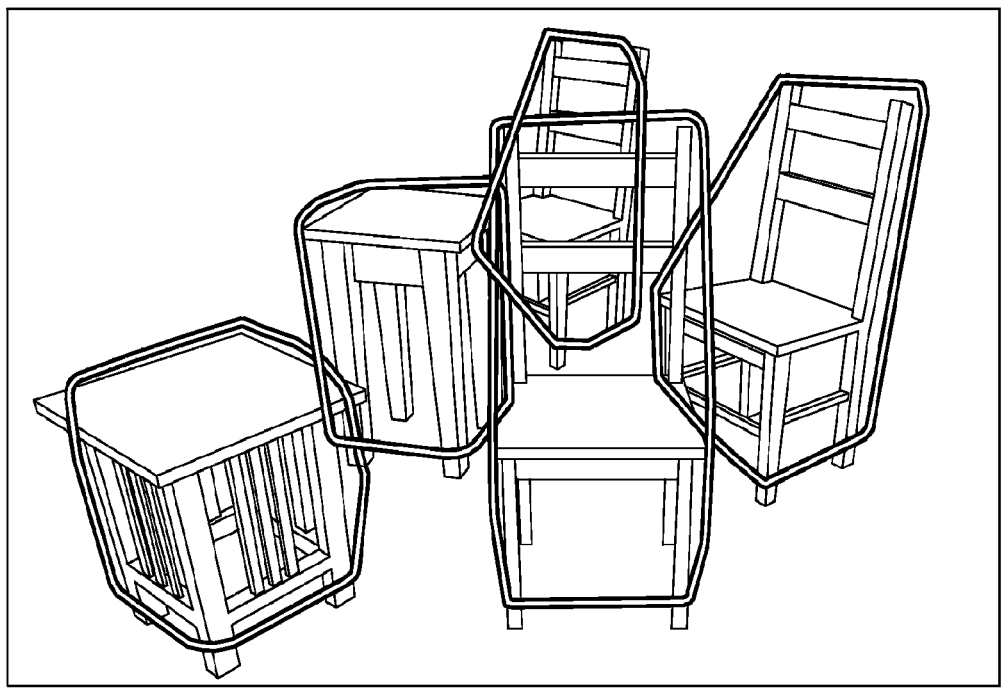
FIG. 5 illustrates the image of FIG. 2(b) overlaid with contours representing objects in the 2-D image.

The value of r is preset in some embodiments, and it can be adjusted in some embodiments. FIG. 4(*a*) shows the result after blurring. Each peak corresponds to a potential object. The system chooses the peaks based on one or more criteria that will occur to those skilled in the art, such as the height of the peaks and pair-wise distances among the peaks. The crosses in FIG. 4(*b*) show the positions of peaks representing objects. Five objects were detected for the scene shown in FIGS. 2(*a*) and 2(*b*), which is a correct result.

(4) Computation of the Size and Orientation of Objects.

In the present embodiment, the system fits rectangles near the position of detected peaks. Rectangles are symmetrical figures, so they will capture the 3-D mirror symmetry of the objects. One can also use other symmetrical figures such as circles or n-gons, depending on the 3-D shapes of the objects. In the case of rectangles, there are five free parameters: the position of the center of a rectangle (2 parameters), the size of rectangle (2 parameters) and the orientation of the rectangle (1 parameter). For each possible rectangle, the system counts the number of its neighboring points. The system selects the rectangle with the maximum number of neighbor points using any suitable technique that will occur to those skilled in the art. FIG. 4(*b*) shows the detected rectangles in this example.

4. Projection of the Estimated 3-D Objects on the 2-D Images, and Identification of the 2-D Regions Representing the Objects Each rectangle (or other symmetrical figure) in the top view is a projection onto the X-Z plane of a 3-D box containing (approximately) the corresponding 3-D object. The system then projects the 3-D points on the symmetrical figure onto the 2-D image of one of the two cameras. These points determine a 2-D region representing this object in the image. Five regions representing five detected objects are shown in FIG. 3. The superimposed curves A, B, C, D, and E are boundaries of convex hulls of points representing individual objects.

To summarize, steps 310-330 represent solving the 3-D figure-ground organization, and step 340 represents solving the corresponding 2-D figure-ground organization.

The output of the method may be after steps 310-330, where the system generates a signal that indicates the position of the figures in three-space. In other embodiments, the system generates a signal after step 340 that indicates the position of the figures as projected back onto the original images. In some embodiments, the 3-D position of objects represented by the symmetric figures are used to reveal camouflaged objects, operate robots in dangerous environments, assist the elderly or disabled by supplementing navigational ability, assisting vision-impaired persons as they walk or drive, informing automatic driving or supplemental driver information systems, guiding robots in navigating home situations, supplementing monitoring of endoscopic and laparoscopic surgery, and the like.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for locating objects in a pair of two-dimensional images of a three-dimensional scene taken by an imaging device having two image capture planes, where the scene includes a floor, the method comprising:

recovering a 3-D point P for each of a plurality of points p that appear in both of the two-dimensional images;

estimating a 3-D orientation of the floor, a 3-D orientation of the image capture planes, and a height of the image capture planes from the floor;

generating a projection C onto a plane parallel to the floor of the collection of points P that do not represent points on the floor;

partitioning the projection C into regions representing objects; fitting one or more symmetric figures to the points in C around the identified regions; and generating an output signal that encodes the one or more symmetric figures.

2. The method of claim 1, wherein the two-dimensional images each have the principal point $(\mu_x, \mu_y)$, the pair is captured by lenses separated by distance d, $\delta(p)$ for each point p that appears in both images is the horizontal shift between the first and second images, and the recovering includes calculating P=Lp where $$L(p) = \begin{pmatrix} \frac{d}{\delta(p)} & 0 & \frac{d}{2} - \frac{d\mu_X}{\delta(p)} \\ 0 & \frac{d}{\delta(p)} & -\frac{d\mu_Y}{\delta(p)} \\ 0 & 0 & \frac{df}{\delta(p)} \\ 0 & 0 & 1 \end{pmatrix}.$$

3. The method of claim 1, wherein the symmetric figures are rectangles.

4. The method of claim 1, wherein the symmetric figures are circles.

5. The method of claim 1, wherein the plane is not coincident with the floor.

6. The method of claim 1, further comprising:

projecting a collection of 3-D points associated with at least one of the symmetric figures onto the 2-D image plane of one of the two cameras, thereby identifying projected figures; and outputting a signal that encodes the projected figures.

7. The system of claim 1, further comprising a stereo camera in communication with the processor, wherein the camera captures the pair of two-dimensional images and communicates the pair of images to the processor.

8. The method of claim 1, wherein the partitioning comprises:

blurring the projection C to produce a blurred image; and identifying clusters representing objects in the blurred image.

* * * * *